June 16, 1953 E. C. LEIGHTON 2,641,815
LICENSE PLATE HOLDER
Filed April 22, 1950
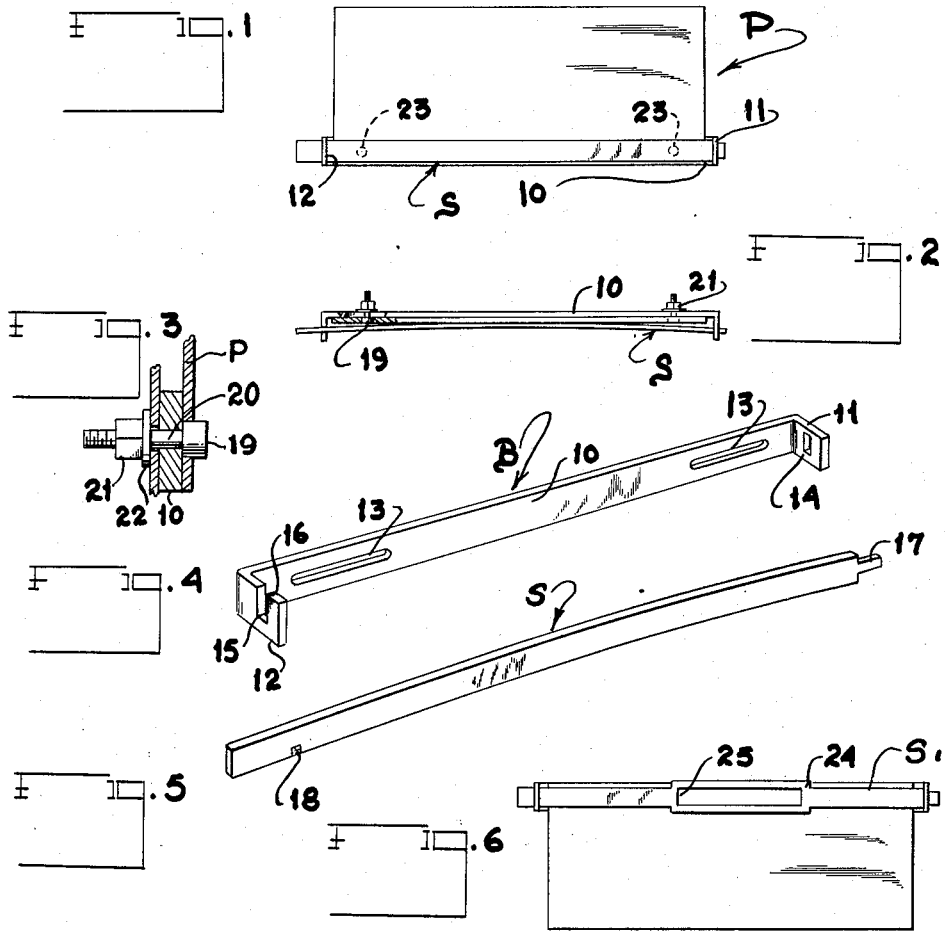
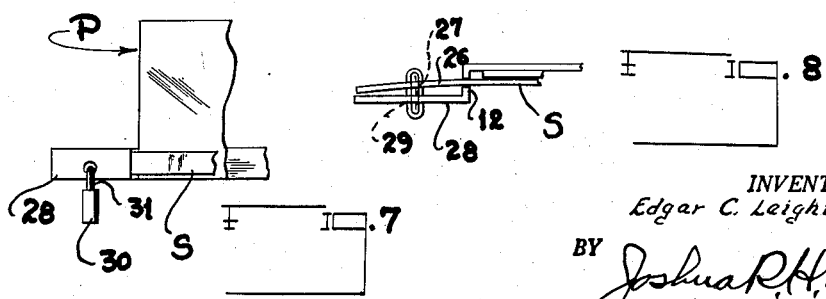
INVENTOR.
Edgar C. Leighton
BY Joshua R. H. Potts
His Attorney Patented June 16, 1953

2,641,815

UNITED STATES PATENT OFFICE 2,641,815

LICENSE PLATE HOLDER

Edgar C. Leighton, Springfield, Pa.

Application April 22, 1950, Serial No. 157,600

2 Claims. (Cl. 24—255)

The present invention has to do with the holders which are commonly employed in attaching license plates to motor vehicles and is concerned primarily with a holder of the detachable type.

At the present time it is the common if not universal practice to secure license plates to frameworks or brackets that are a permanent part of the motor vehicle by employing bolts and nuts. At the expiration of an annual period it is necessary to change the license plates. Due to the exposure to weather the threads of the bolts become rusted and in almost all cases it is necessary to cut off the bolts and use new ones. While the expense of the bolts themselves may be an inconsiderate matter the time consumed in cutting off the old bolts renders the change of the license plates a highly annoying time-consuming operation.

With the foregoing conditions in mind, the present invention has in view as its foremost objective the provision of a license plate holder of the character above noted which is of a highly simplified construction, securely holds the license plates in position, and yet may be readily operated to remove a set of old plates and position a new set when occasion demands.

In carrying out this objective this invention provides a license plate holder which consists essentially of a bar that is intended to be permanently secured to the motor vehicle and which is formed with an outturned ear at each end. One of these ears is formed with an opening and the other with a recess terminating in the upper edge thereof. Cooperating with this bar is a bowed leaf spring having a tongue at one end which is fitted in the opening in one of the ears with the other end received in the recess.

One edge of the license plate is intended to be clamped between this spring and the bar aforesaid.

The license plate holder which is provided by the present invention is adapted to grippingly engage a pair of license plates either along the bottom edge or the top edge. Nearly all license plates are provided with holes both at the top and bottom. In order to supplement the holding effects of the leaf spring the screw bolts which permanently attach the bar to the motor vehicle have protruding heads or extensions at the front which are received in the holes in the license plates.

Various other more detailed objects and advantages of the invention such as arise in connection with carrying out the above noted ideas in a practical embodiment will, in part become apparent, and in part be hereinafter stated as the description of the invention proceeds.

The invention, therefore, comprises a license plate holder which consists essentially of a bar that is intended to be permanently secured to a motor vehicle by a pair of bolt and nut assemblies with the ends of the bolts projecting beyond the face of the bar where they are adapted to be received in the holes in license plates. This bar has an outturned ear at each end with the ear at one end being formed with an opening while the other ear is formed with a slot opening into the upper edge thereof and having an inturned lip on its outer edge. Cooperating with this bar is a bowed spring having a tongue at one end received in the opening with the other end received in said slot and with the latter end portion having a notch on its lower edge which receives the ear at the bottom edge of the slot.

Both the bar and spring may be formed with extensions formed with aligned openings for receiving the hasp of a padlock. When the holder is used to clamp the edge of a license plate which has indicia therealong, the spring may be enlarged centrally and formed with a slot through which said indicia is visible.

For a full and more complete understanding of the invention, reference may be had to the following description and accompanying drawing wherein:

Figure 1 is an elevational showing of a license plate held in position by the holder of this invention.

Figure 2 is a top plan view of the holder shown in Figure 1 but with parts broken away and shown in section.

Figure 3 is an enlarged detailed section through the bar where one of the nut and bolt assemblies anchors it to the frame of a motor vehicle.

Figure 4 is an enlarged detailed perspective of the bar per se.

Figure 5 is an enlarged detailed perspective of the spring per se.

Figure 6 is a view similar to Figure 1 of a modification which accommodates indicia along one edge of the license plate.

Figure 7 is a fragmentary view of one end of the holder and the portion of the license plate associated therewith showing the arrangement for locking the holder in position; and Figure 8 is a top plan view of the matter depicted in Figure 7.

Referring now to the drawing wherein like reference characters denote corresponding parts, and first more particularly to Figure 4, the license plate holder of this invention is shown as including as an essential element a bar B. This bar B includes a main body portion 10 and end flanges or ears 11 and 12.

The main body portion 10 is formed with two slots 13 which are provided for the purpose of anchoring the bar to the body of a motor vehicle as will be later described. The ear 11 is formed with an opening or aperture 14 which preferably is of the rectangular formation illustrated. The ear 12 is formed with a slot 15 which opens onto its upper edge and the front edge of the slot 15 is provided with an overhanging lip 16 for a purpose to be later described.

Referring now more particularly to Figure 5, the holder is shown as including as an essential element a leaf spring or elongated member S which preferably takes the elongated formation illustrated and which is slightly bowed from end to end. This spring S is preferably made of a good spring steel which will retain its elastic characteristics. At one end this spring S is formed with a tongue 17 which is adapted to be received in the opening 14 and at the other end, on its lower edge, is formed with a notch 18. This notch 18 is so located that it will receive the lower edge of the slot 15 when the spring is in holding position.

The bar B is intended to be permanently secured to the frame of the motor vehicle. To accomplish this, two screw and bolt assemblies are employed. One of these assemblies is shown in Figure 3. It comprises a bolt 19 having a reduced neck at 20 which is received in one of the slots 13. A nut 21 is threaded on the bolt 19 and a washer 22 may be included. A bolt and nut assembly is associated with each of the slots 13 and the two are effective to securely and permanently attach the bar B to the framework of a motor vehicle in a well known manner. When so attached the ends or heads of the bolts 19 form projections and will project beyond the outer face of the main body portion 10 of the bar B.

The purpose of the slots 13 is to permit of the relative positioning of these bolts so that the distance between the heads 19 will correspond to the spacing between the holes of a license plate. Such a license plate is depicted in Figures 1 and 2 and designated P.

As shown in Figure 1 the license plate P includes a pair of openings 23 along its bottom edge. With the openings 23 receiving the heads of the bolts 19 as illustrated in Figure 2, the spring S is positioned by inserting the tongue 17 into the opening 14 and then swinging the other end of the spring downwardly into the slot 15. As this downward movement is continued the notch 18 will receive the bottom edge of the slot 15 and when the spring is released its natural resiliency will cause the end portion at the ear 12 to move outwardly to be received beneath the lip 16. This lip thus serves to retain that end of the spring in position in the slot and guards against accidental displacement of the spring.

Due to this inherent resiliency of the spring, the lower edge of the license plate is securely clamped between the spring S and the bar B.

First modification

In Figure 6 a slightly modified form of the invention is therein illustrated. In this form the spring which is designated S1 has a central portion that is enlarged or widened as represented at 24. This widened portion is formed with an elongated slot 25 which ordinarily will be positioned over any indicia which may be present along the edge of the license edge. Thus, this indicia is visible through the slot 25.

Second modification

Referring now more particularly to Figures 7 and 8, the spring S is shown as continued out beyond the ear 12 to provide an extension 26. This extension 26 is formed with an opening 27.

The ear 12 is also provided with a lateral extension 28 and this extension 28 is formed with an opening 29 which is in alignment with the opening 27. A padlock shown at 30 has a hasp 31 which passes through the aligned openings 27 and 29. With the padlock 30 in the locked position illustrated, it is impossible for unauthorized persons to release the spring S so as to remove the license plate P from the holder.

While preferred specific embodiments of the invention are hereinbefore set forth, it is to be clearly understood that the invention is not to be limited to the exact constructions, mechanisms, and devices illustrated and described because various modifications of these details may be provided in putting the invention into practice within the purview of the appended claims.

What is claimed is:

1. In a license plate holder, the combination of: a bar formed with a pair of spaced slots and having an outturned ear at each end thereof, a nut and bolt assembly associated with each of said slots for permanently securing said bar to the body of a motor vehicle, each of said nut and bolt assemblies presenting a head protruding from the face of said bar, and which heads are adapted to be received in the openings in a license plate to be held thereby, one of said ears being formed with an opening and the other with a slot opening onto the top edge thereof, and a bowed spring having a tongue at one end received in said opening with its other end received in said slot, said spring and bar being adapted to clampingly engage a license plate therebetween with the openings in the license plate receiving the heads of said bolts.

2. In a license plate holder, the combination of: a bar formed with a pair of spaced slots and having an outturned ear at each end thereof, a nut and bolt assembly associated with each of said slots for permanently securing said bar to the body of a motor vehicle, each of said nut and bolt assemblies presenting a head protruding from the face of said bar, and which heads are adapted to be received in the openings in a license plate to be held thereby, one of said ears being formed with an opening and the other with a slot opening onto the top edge thereof, the front edge of said slot being formed with an overhanging lip, and a bowed spring having a tongue at one end received in said opening with its other end having a notch on its lower edge and received in said slot, said spring and bar being adapted to clampingly engage a license plate therebetween with the openings in the license plate receiving the heads of said bolts.

EDGAR C. LEIGHTON.

References Cited in the file of this patent

UNITED STATES PATENTS

| Number | Name | Date |
|---|---|---|
| 370,116 | Berry | Sept. 20, 1887 |
| 811,880 | Steensland | Feb. 6, 1906 |
| 857,100 | Norman | June 18, 1907 |
| 949,880 | Brock | Feb. 22, 1910 |
| 1,245,963 | Patterson | Nov. 6, 1917 |
| 1,743,693 | Smith | Jan. 14, 1930 |
| 1,803,431 | Hill | May 5, 1931 |
| 2,047,936 | Blakeslee | July 21, 1936 |
| 2,123,796 | Peters | July 12, 1938 |
| 2,127,230 | Moineau | Aug. 16, 1938 |
| 2,292,206 | Davis | Aug. 4, 1942 |